(12) United States Patent
Huang et al.

(10) Patent No.: US 12,435,428 B2
(45) Date of Patent: Oct. 7, 2025

(54) HIGH-PRESSURE AND MULTI-ATMOSPHERE ASSISTED SLM GRADIENT MATERIAL PREPARATION METHOD AND ALUMINUM-LITHIUM ALLOY COATING

(71) Applicant: Jiangsu University, Jiangsu (CN)

(72) Inventors: Lei Huang, Jiangsu (CN); Jianzhong Zhou, Jiangsu (CN); Yanqiang Gou, Jiangsu (CN); Li Li, Jiangsu (CN); Xiankai Meng, Jiangsu (CN); Shu Huang, Jiangsu (CN)

(73) Assignee: Jiangsu University, Jiangsu (CN)

( * ) Notice: Subject to any disclaimer, the term of this patent is extended or adjusted under 35 U.S.C. 154(b) by 0 days.

(21) Appl. No.: 19/117,465

(22) PCT Filed: Jan. 11, 2024

(86) PCT No.: PCT/CN2024/071711
§ 371 (c)(1),
(2) Date: Apr. 1, 2025

(87) PCT Pub. No.: WO2025/138349
PCT Pub. Date: Jul. 3, 2025

(65) Prior Publication Data
US 2025/0257467 A1 Aug. 14, 2025

(30) Foreign Application Priority Data
Dec. 25, 2023 (CN) .......................... 202311794170.7

(51) Int. Cl.
*C23C 24/10* (2006.01)
*B22F 10/28* (2021.01)
(Continued)

(52) U.S. Cl.
CPC ............ *C23C 24/106* (2013.01); *B22F 10/28* (2021.01); *B22F 10/50* (2021.01); *B33Y 10/00* (2014.12);
(Continued)

(58) Field of Classification Search
CPC ..... C23C 24/10; C23C 24/103; C23C 24/106; B33Y 10/00; B22F 10/28; B22F 10/50; B22F 7/02; B22F 7/008; C22C 21/00
See application file for complete search history.

(56) References Cited

U.S. PATENT DOCUMENTS 8,288,019 B2 * 10/2012 Nagano ............... C23C 14/3414
204/192.15
10,919,090 B2 * 2/2021 Feldmann ............... B22F 12/41
(Continued)

FOREIGN PATENT DOCUMENTS

| CN | 105154825 A | 12/2015 |
|---|---|---|
| CN | 107737932 A | 2/2018 |

(Continued)

OTHER PUBLICATIONS

International Search Report cited in PCT/CN2024/071711, mailed Jun. 14, 2024, 8 pages.

(Continued)

*Primary Examiner* — Michael P Wieczorek
(74) *Attorney, Agent, or Firm* — Cooper Legal Group, LLC

(57) ABSTRACT

The present disclosure provides a high-pressure and multi-atmosphere assisted SLM gradient material preparation method and an aluminum-lithium alloy coating. The high-pressure and multi-atmosphere assisted SLM gradient material preparation method includes the following steps: injecting a first gas mixture into a working box, and enabling, by laser irradiation, molten materials in a micro-melt pool to (Continued)

react with a carbon-containing gas to form a carbide-doped first gradient aluminum-lithium alloy coating; injecting a second gas mixture into the working box, and enabling, by laser irradiation, molten materials in a micro-melt pool to react with a carbon and nitrogen-containing gas to form a carbide and nitride-doped second gradient aluminum-lithium alloy coating; and injecting a third gas mixture into the working box, and enabling, by laser irradiation, molten materials in a micro-melt pool to react with a nitrogen-containing gas to form a nitride-doped third gradient aluminum-lithium alloy coating. The present disclosure improves the surface forming quality of an aluminum-lithium alloy material, and the material is hard outside and tough inside.

7 Claims, 4 Drawing Sheets

(51) Int. Cl.
  *B22F 10/50* (2021.01)
  *B33Y 10/00* (2015.01)
  *B33Y 80/00* (2015.01)
  *C23C 8/30* (2006.01)
(52) U.S. Cl.
  CPC ............... *B33Y 80/00* (2014.12); *C23C 8/30* (2013.01); *B22F 2201/02* (2013.01); *B22F 2201/04* (2013.01); *B22F 2301/052* (2013.01); *B22F 2998/10* (2013.01)

(56) References Cited

U.S. PATENT DOCUMENTS

| | | | |
|---|---|---|---|
| 2007/0102748 | A1 | 5/2007 | Tseng et al. |
| 2019/0348202 | A1 | 11/2019 | Sachdev et al. |
| 2021/0039164 | A1 | 2/2021 | Morton et al. |

FOREIGN PATENT DOCUMENTS

| | | | |
|---|---|---|---|
| CN | 108465814 | A | 8/2018 |
| CN | 110871272 | A | 3/2020 |
| CN | 111702177 | A | 9/2020 |
| CN | 115287588 | A | 11/2022 |
| CN | 116855880 | A | 10/2023 |
| EP | 3006138 | A1 | 4/2016 |
| KR | 20010068629 | A | 7/2001 |
| WO | 2022028517 | A1 | 2/2022 |

OTHER PUBLICATIONS

First CN Office Action cited in CN202311794170.7, mailed Dec. 12, 2024, 7 pages.
Notification of Grant cited in CN202311794170.7, mailed Jan. 6, 2025, 3 pages.

* cited by examiner

HIGH-PRESSURE AND MULTI-ATMOSPHERE ASSISTED SLM GRADIENT MATERIAL PREPARATION METHOD AND ALUMINUM-LITHIUM ALLOY COATING

TECHNICAL FIELD

The present disclosure relates to the technical field of SLM formation, in particular to a high-pressure and multi-atmosphere assisted SLM gradient material preparation method and an aluminum-lithium alloy coating.

BACKGROUND

In the aerospace field, the third-generation novel aluminum-lithium alloy has been widely applied to the skin, long purlins and floor beams of aircrafts because of its low density, high elastic modulus, good corrosion resistance and small anisotropy. However, with the improvement of application technologies of aluminum-lithium alloy, the aluminum-lithium alloy is gradually applied to large and complex main force-bearing structures, which are generally manufactured by casting, forging, rolling, extrusion and other forming methods and assembled by riveting and welding. However, such a machining method already cannot satisfy the development requirements of aerospace engineering workpieces for complex structures and function integration at present. In addition, in small-batch production, the preparation cost and the production cycle are increased significantly. So, it is urgently needed to develop an aluminum-lithium alloy component integrated-preparation technique with a low cost and a short production cycle.

Additive manufacturing has become a research focus of integrated preparation technologies for metal materials because of its outstanding advantages (design and manufacturing integration, high machining precision, short manufacturing cycle, good physical and chemical properties of products, etc.) in manufacturing of complex structural components. At present, additive manufacturing techniques for metal materials mainly include laser additive manufacturing, electron beam additive manufacturing, and wire and arc additive manufacturing. Wherein, the electron beam additive manufacturing technique and the wire and arc additive manufacturing technique easily cause serious heat accumulation of parts, and an excessive heat input will lead to bulk metal structures and more brittle phases, thus directly compromising the metallurgical bonding strength, packing size accuracy and surface quality of parts. The laser additive manufacturing technique featured with accurate formation and high-performance formation has become at the moment the most reliable and practical additive manufacturing method for metals.

Selective laser melting (SLM) realizes laminated formation of parts by layer-by-layer powder laying and selective heating of different regions with a laser beam and achieve low-cost and short-process manufacturing of complex components. Generally, parts formed by SLM have low surface roughness and high dimensional accuracy and can satisfy smoothness requirements without subsequent treatment or only by simple surface machining. However, different from aluminum alloys with similar components, the addition of Li further increases the coefficient of thermal expansion and the melt pool solidification temperature range of aluminum-lithium alloy and leads to a significant increase in intergranular low-melting eutectic crystals, so the thermal crack sensitivity of the aluminum-lithium alloy is apparently higher than that of conventional aluminum alloys, and the tendency to thermal cracks of the aluminum-lithium alloy will be aggravated under the action of a high-energy laser beam, thus greatly reducing the forming quality and mechanical property of aluminum-lithium alloy parts prepared by SLM.

To alleviate the tendency to thermal cracks, process methods such as a low velocity, a high energy density, preheating, short scanning and addition of supports, or a microelement alloying method has been used at present. The study shows that it is difficult to complete avoid crack defects merely by means of process adjustments; although the alloying method is effective in promoting the transformation of grains in a coating to isometric crystals, narrowing the melt pool solidification temperature range and effectively refining the grain structure, the distribution and solubility of microelements added to the coating are difficult to control, and microelement grains are prone to clustering and segregation on grain boundary, thus compromising the internal stress distribution and mechanical property of materials. Existing processes cannot satisfy formation and performance requirements of samples formed by SLM at the same time, which affects the development and application of aluminum-lithium alloy components prepared by additive manufacturing in actual production.

SUMMARY

In view of the defects in the prior art, the present disclosure provides a high-pressure and multi-atmosphere assisted SLM gradient material preparation method and an aluminum-lithium alloy coating. On the basis of an existing SLM-based aluminum-lithium alloy coating forming process, pulse laser is used as a laser heat source to melt powder and a matrix. In the process of preparing a first gradient aluminum-lithium alloy coating, $CO_2$ in an active gas is dissociated quickly under the action of laser irradiation and plasma is formed; with the further absorption of laser energy, active carbon atoms are continuously dissociated from the plasma, and under the action of a high pressure and swelling shock waves of the plasma, the carbon atoms fully react with molten materials in a melt pool to form carbides, such that carbide doping of the aluminum-lithium alloy coating is realized, the carbon content of the coating is increased, and the hardness and abrasion resistance of the surface of the first gradient aluminum-lithium alloy coating are effectively improved. In the process of preparing a third gradient aluminum-lithium alloy coating with a $N_2$-doped active gas, aluminum-lithium alloy powder is irradiated with laser to form a high-temperature liquid micro-melt pool, $N_2$ is dissociated in the vicinity of the high-temperature melt pool, then infiltrates into the melt pool by means of a gas-liquid interface, migrates in the melt pool and finally is dissolved, such that nitride doping of the coating is realized, and the hardness and mechanical property of the third gradient aluminum-lithium alloy coating are greatly improved. A second gradient aluminum-lithium alloy coating is prepared in a carbon and nitrogen-containing active atmosphere, the second gradient aluminum-lithium alloy coating is a transition coating, doping of two types of reinforcing particles in the transition coating is realized, and a gradient, continuous and transitional change of the alloy structure is ensured, such that a sudden change of the microstructure of the transition coating is effectively alleviated, the accumulation of internal residual stress and thermal stress is reduced, and the interlayer bonding force of an aluminum-lithium alloy gradient material is effectively improved. In the multi-atmosphere assisted SLM formation process, powder laid by a porous duster is uniform and loose, such that the contact area between the aluminum-lithium alloy powder and the active gas is enlarged, and active atoms are directly dissociated in the melt pool from part of the active gases stored in powder gaps under the action of high-temperature laser, thus effectively promoting an in-situ synthesis reaction in the melt pool, increasing the carbon content and nitrogen content of the gradient material, and further improving the mechanical property of the material. In addition, the high-pressure environment may reduce the critical nucleation free energy of aluminum-lithium alloy to increase the critical nucleation density so as to increase the nucleation rate, such that the grain structure is refined, the tendency to cracks of the coating is restrained; in addition, the stress asymmetry of molecules on the surface of a high-temperature melt is effectively reduced, the reaction rate of active gas molecules and molten substances is increased, the smoothness of a formed surface is improved, and in-situ synthesis doping of carbides and nitrides in the coatings is promoted. Moreover, with the gradient decrease of the pressure in the SLM formation process, the grain size in the coatings increases gradually; particularly, the pressure in the preparation process of the first gradient aluminum-lithium alloy coating is the maximum, so the grain size of the first gradient aluminum-lithium alloy coating decreases significantly, the proportion of high-angle grain boundaries is increased accordingly, the propagation of microcracks in the coating requires more energy, and the toughness of the first gradient aluminum-lithium alloy coating is improved; in conjunction with the transition coating and the third gradient coating that have extremely high hardness due to the doping of hard-phase nitride particles, the prepared aluminum-lithium alloy gradient material is hard outside and tough inside. Therefore, the SLM aluminum-lithium alloy gradient material prepared based on a gradient high-temperature environment and doping of multiple carbon and nitrogen-containing active atmospheres has better surface forming quality and satisfies the performance requirements for external hardness and internal toughness.

The present disclosure fulfills the above technical purposes by the following technical means.

A high-pressure and multi-atmosphere assisted SLM gradient material preparation method includes the following steps:

continuously injecting a first gas mixture into an airtight working box to maintain a high-pressure environment in the working box, wherein the first gas mixture is a gas mixture of an inert gas and a carbon-containing active gas; irradiating aluminum-lithium alloy powder laid on a surface of a substrate with laser to form a micro-melt pool, and enabling molten materials in the micro-melt pool to react with the carbon-containing active gas to form carbide-doped first gradient aluminum-lithium alloy coating;

discharging the first gas mixture out of the airtight working box; continuously injecting a second gas mixture into the airtight working box to maintain a high-pressure environment in the working box, wherein the second gas mixture is a gas mixture of an inert gas and a carbon and nitrogen-containing active gas; irradiating aluminum-lithium alloy powder laid on a surface of the first gradient aluminum-lithium alloy coating with laser to form a micro-melt pool, and enabling molten materials in the micro-melt pool to reactive with the carbon and nitrogen-containing active gas to form a carbide and nitride-doped second gradient aluminum-lithium alloy coating; and discharging the second gas mixture out of the airtight working box; continuously injecting a third gas mixture into the airtight working box to maintain a high-pressure environment in the working box, wherein the third gas mixture is a gas mixture of an inert gas and a nitrogen-containing active gas; irradiating aluminum-lithium alloy powder laid on a surface of the second gradient aluminum-lithium alloy coating with laser to form a micro-melt pool, and enabling molten materials in the micro-melt pool to reactive with the nitrogen-containing active gas to form a nitride-doped third gradient aluminum-lithium alloy coating.

Further, the carbon-containing active gas in the first gas mixture is a $CO_2$ gas, and a volume ratio of the $CO_2$ gas in the first gas mixture is 10%-20%; the carbon and nitrogen-containing active gas in the second gas mixture includes a $CO_2$ gas and a $N_2$ gas, a volume ratio of the $CO_2$ gas in the second gas mixture is 10%-20%, and a volume ratio of the $N_2$ gas in the second gas mixture is 20%-30%; the nitrogen-containing active gas in the third gas mixture is a $N_2$ gas, and a volume ratio of the $N_2$ gas in the third gas mixture is 20%-30%.

Further, a pressure of the high-pressure environment created by the first gas mixture is $P_1$, a pressure of the high-pressure environment created by the second gas mixture is $P_2$, a pressure of the high-pressure environment created by the third gas mixture is $P_3$, and $P_1>P_2>P_3$.

Further, the pressure $P_1$ of the high-pressure environment created by the first gas mixture is 3.5-5.0 MPa, the pressure $P_2$ of the high-pressure environment created by the second gas mixture is 2.0-2.5 MPa, and the pressure $P_3$ of the high-pressure environment created by the third gas mixture is 1.0-1.5 MPa.

Further, in an SLM formation process, a flow rate of the active gases is maintained at 20 L/min-50 L/min to ensure that a concentration of the active gases in the reaction process of the molten materials is within a set range.

Further, uniform and loose aluminum-lithium alloy powder is laid by means of a porous duster to ensure that part of the active gases is stored in the powder.

Further, the first gradient aluminum-lithium alloy coating and the third gradient aluminum-lithium alloy coating have a thickness of 0.8-1.0 mm, and the second gradient aluminum-lithium alloy coating has a thickness of 0.6-0.8 mm.

Further, surface roughness of the surface of the substrate is increased to improve bonding strength of the formed aluminum-lithium alloy coatings and the substrate; after being treated with absolute ethyl alcohol, the surface of the substrate is ultrasonically cleaned and dried.

Further, the laser is pulse laser, and parameters of a pulse laser beam are as follows: a wavelength is 1075 nm, pulse energy is 1 J-30 J, a pulse period is 80 ms, a pulse duration is 20-60 ms, a duty cycle is 50%, and a spot diameter is less than or equal to 50 km; a laser power is 80-100 W, a scan speed of the laser beam is 100 mm/s, and a scan interval is 100-120 km.

An aluminum-lithium alloy coating is formed on a surface of a base material by means of the high-pressure and multi-atmosphere assisted SLM gradient material preparation method.

The present disclosure has the following beneficial effects:

1. According to the high-pressure and multi-atmosphere assisted SLM gradient material preparation method provided by the present disclosure, pulse laser is used as an irradiation heat source, and compared with a traditional continuous laser mode, the pulse laser may accurately adjust the distribution of laser energy in the time domain by controlling pulse parameters, to exert a direct influence on the microstructure of a formed part. In the SLM preparation process, the pulse laser allows for periodical cooling and solidification of the melt pool to achieve an enhanced stirring effect on the liquid melt pool, and the stirring effect not only can reduce the dendrites space distance to allow elements in the melt pool to be diffused more uniformly and sufficiently, but also can increase the proportion of recrystallization of the melt pool to reduce the anisotropy of grains; in addition, under the action of the pulse laser, the temperature of a matrix is decreased, and the cooling rate of the melt pool is increased, such that the heat accumulation of the whole aluminum-lithium alloy material is reduced, and the residual stress of the materials is significantly reduced.

2. According to the high-pressure and multi-atmosphere assisted SLM gradient material preparation method provided by the present disclosure, the first gas mixture includes Ar and the $CO_2$ active gas with a volume ratio of 10%-20%, and the Ar and the $CO_2$ active gas with the volume ratio of 10%-20% are used for atmospheric doping in the preparation process of the first gradient aluminum-lithium alloy coating; under the irradiation of intense pulse laser with a high power density, $CO_2$ in the active gas is dissociated in the high-temperature and high-pressure environment and plasma is formed above the melt pool. In the plasma, $CO_2$ is dissociated into CO and O, and with further absorption of laser energy, CO is dissociated into C and O; because the solubility of active carbon atoms in high-temperature liquid metal is far higher than that of oxygen atoms, the active carbon atoms in the dissociated substances are stirred and blended with molten materials in the melt pool under the action of the high pressure assisted environment and swelling shock waves of the plasma to form in situ carbide particles, which are uniformly dispersed in the coating, such that the carbon content a near-surface layer of the aluminum-lithium alloy coating is increased, thus effectively improving the hardness and abrasion resistance of the first gradient aluminum-lithium alloy coating; moreover, $CO_2$, as a highly thermally conductive gas, can effectively improve the overall thermal conductivity of the molten alloy powder and increase the cooling rate of the melt pool, such that the microstructure and mechanical property of the aluminum-lithium alloy coating are further improved.

3. According to the high-pressure and multi-atmosphere assisted SLM gradient material preparation method provided by the present disclosure, the third gas mixture includes Ar and the $N_2$ active gas with a volume ratio of 20%-30%, the Ar and the $N_2$ active gas with the volume ratio of 20%-30% are used for atmospheric doping in the preparation process of the third gradient aluminum-lithium alloy coating; under the action of high-power laser irradiation, active nitrogen carbons are dissociated from $N_2$ in the active gas, and similarly, under the synergistic action of the high-pressure environment and the swelling shock waves of the plasma, the nitrogen atoms above the high-temperature melt pool infiltrate into the melt pool and are stirred and blended with molten materials to realize nitrogen doping of the third gradient coating; because the hardness of nitride particles is remarkably higher than that of carbide particles, the hardness and mechanical property of the third gradient aluminum-lithium alloy coating are greatly improved, as compared with the first gradient aluminum-lithium alloy coating. In addition, on one hand, the high-pressure environment in the working box increases the nitrogen partial pressure in the SLM and solidification process, and the nitrogen atoms (solute) in the melt pool will not reach the saturation solubility, such that the content of nitrogen diffused into the high-temperature melt pool in the forming process is increased, thus effectively increasing the content of nitrogen diffused into the coating; on the other hand, the pressure on the surface of the melt pool increases with the high-pressure environment, such that the escape of nitrogen is effectively restrained. In this way, the third gradient aluminum-lithium alloy coating prepared with the assistance of the high pressure and the nitrogen-containing active gas has better surface hardness and mechanical stability.

4. According to the high-pressure and multi-atmosphere assisted SLM gradient material preparation method provided by the present disclosure, the third gas mixture includes Ar and the (10%-20%) $CO_2$ and (20%-30%) $N_2$ active gas, and the Ar and the (10%-20%) $CO_2$ and (20%-30%) $N_2$ active gas are used for atmospheric doping in the preparation process of the transition coating; under the action of laser irradiation, active carbon atoms and nitrogen atoms are dissociated from $CO_2$ and $N_2$ at the same time, and the active atoms react with molten substances in the melt pool to realize synchronous doping of carbides and nitrides in the transition coating. It should be noted that because the ionization energy (11.26 eV) of carbon is lower than the ionization energy (14.35 eV) of nitrogen, the carbon atoms in the transition coating react with molten materials in the melt pool more easily than the nitrogen atoms, as a result, with the atmospheric assistance of the same $N_2$ concentration, the quantity of nitrides doped in the transition coating is less than the quantity of nitrides doped in the third gradient aluminum-lithium alloy coating, the overall hardness of the transition coasting is lower than that of the third gradient aluminum-lithium alloy coating, and the brittleness of the transition layer is effectively relieved. In addition, under the action of the gradient pressure, the fineness of the microstructure in the transition coating is between the fineness of the first gradient aluminum-lithium alloy coating and the fineness of the third gradient aluminum-lithium alloy coating, such that a sudden change of the microstructure of the material is effectively alleviated. In this way, the presence of the transition coating allows for a continuous and transitional change of the mechanical property and microstructure of the aluminum-lithium alloy material, reduces the accumulation of thermal stress and residual stress in the material, remarkably improves the bonding strength between the gradient coatings, and further prolongs the service life of the SLM gradient material.

5. According to the high-pressure and multi-atmosphere assisted SLM gradient material preparation method provided by the present disclosure, uniform and loose aluminum-lithium alloy powder is laid on the substrate by means of the porous duster, the loose powder structure allows for the storage of part of the active gases in the powder, and under the action of high-temperature laser, active atoms are dissociated directly in the melt pool, such that the concentration of active atoms dissolved in the melt pool is increased, the reaction efficiency of the molten substances and the active gases is effectively promoted, and the content of carbides and nitrides doped in the gradient material is increased, thus further improving the mechanical property of the aluminum-lithium alloy material.

6. According to the high-pressure and multi-atmosphere assisted SLM gradient material preparation method provided by the present disclosure, an SLM sample is prepared by a high pressure-assisted process, and the physical effect of the pressure is to provide nucleation energy for molten metal to promote more atomic groups to participate in crystallization nucleation, such that the nucleation rate of the melt pool is remarkably increased to fulfill a grain refining effect. In addition, the high-pressure environment affects the surface tension between the molten metal and the gases, reduces the stress asymmetry of molecules on the surface of the high-temperature melt, increases the partial pressure of carbon and nitrogen on the gas-liquid interface on the surface of the melt pool, and raises the absorbent concentration of active carbon atoms and nitrogen atoms in the melt pool, such that the smoothness of a formed surface is improved, and in-site synthesis doping of carbides and nitrides in the aluminum-lithium alloy coating is effectively promoted; in addition, the enhanced stirring effect of the pulse laser allows for a more uniform distribution of inclusion particles in the coating, thus further improving the mechanical property of the aluminum-lithium alloy.

7. According to the high-pressure and multi-atmosphere assisted SLM gradient material preparation method provided by the present disclosure, a gradient pressure environment is used to assist in formation of the SLM gradient material to allow the grain size of the material to increase gradually from inside to outside, wherein the first gradient coating has a minimum grain size, and the number of fine grains in unit volume is significantly greater than that in the transition coating and the third gradient coating, such that there will be a great many orientation-favorable grains when plastic deformation occurs, and the deformation may be uniformly decentralized all the grains, thus reducing the deformation nonuniformity of fine-grained metal and making distribution uniformity of internal stress of the coatings. In addition, with the decrease in the grain size, the probability of occurrence of grain boundary sliding will be increased; because of the mobility of grain boundaries, the stress concentration produced by dislocation in the vicinity of grain boundaries is slacked easily to disperse stress-concentrated positions so as to facilitate further plastic deformation of the coating, such that the plasticity and ductility of the first gradient coating are remarkably improved. The grain refining effect of the transition coating and the third gradient coating will be alleviated gradually with the decrease in the pressure in the preparation process, such that the toughness of the coatings is reduced; however, due to the doping of high-hardness nitrides, the surface hardness and abrasion resistance of the transition coating and the third gradient coating are greatly improved. In this way, the prepared aluminum-lithium alloy gradient material is hard outside and tough inside.

8. According to the high-pressure and multi-atmosphere assisted SLM gradient material preparation method provided by the present disclosure, all process parameters including pulse parameters, laser parameters, and high-pressure and atmospheric parameters may be controlled by an algorithm, such that the method has the advantages of easy to operate, low in cost and high in efficiency, can realize industrial application easily, and has a broad application prospect for the service environment of aerospace aluminum-lithium alloy.

BRIEF DESCRIPTION OF THE DRAWINGS

To better clarify the technical solutions in the embodiments of the present disclosure or the prior art, drawings used for describing the embodiments of the present disclosure or the prior art are briefly introduced below. The drawings described below only illustrate some embodiments of the present disclosure, and those ordinarily skilled in the art may easily obtain other drawings according to the following ones without creative labor.

In the drawings.

1, working box; 2, substrate; 3, porous duster; 4, boost pump; 5, evacuation pump; 6, gas flow meter; 7, pressure gauge.

DETAILED DESCRIPTION OF THE EMBODIMENTS

The embodiments of the present disclosure are described in detail below. Examples of the embodiments are shown in accompanying drawings, wherein identical or similar reference signs indicate identical or similar elements or elements with identical or similar functions. The embodiments described below with reference to the accompanying drawings are illustrative ones used to explain the present disclosure rather than limiting the present disclosure and should not be construed as limitations of the present disclosure.

In the description of the present disclosure, it should be understood that terms "center", "longitudinal", "transverse", "length", "width", "thickness", "upper", "lower", "axial", "radial", "vertical", "horizontal", "inner" and "outer" are used to indicate directional or positional relations based on the accompanying drawings merely for the purpose of facilitating and simplifying the description of the present disclosure, do not indicate or imply that devices or elements referred to must be in a specific direction or be configured and operated in a specific direction, and thus should not be construed as limitations of the present disclosure. In addition, terms "first" and "second" are merely for the purpose of description and should not be construed as indicating or implying relative importance or implicitly indicating the number of technical features referred to. Therefore, a feature defined by "first" or "second" may explicitly or implicitly indicate the inclusion of one or more said features. In the description of the present disclosure, "multiple" means two or more, unless otherwise expressly and specifically defined.

In the present disclosure, unless otherwise expressly stated and defined, terms "install", "link", "connect" and "fix" should be broadly understood. For example, "connect" may refer to fixed connection, detachable connection or integrated connection; mechanical connection or electrical connection; direct connection, indirect connection by means of an intermediate medium, or internal connection of two elements. Those ordinarily skilled in the art may appreciate the specific meaning of these terms in the present disclosure as the same may be.

Figure 1:
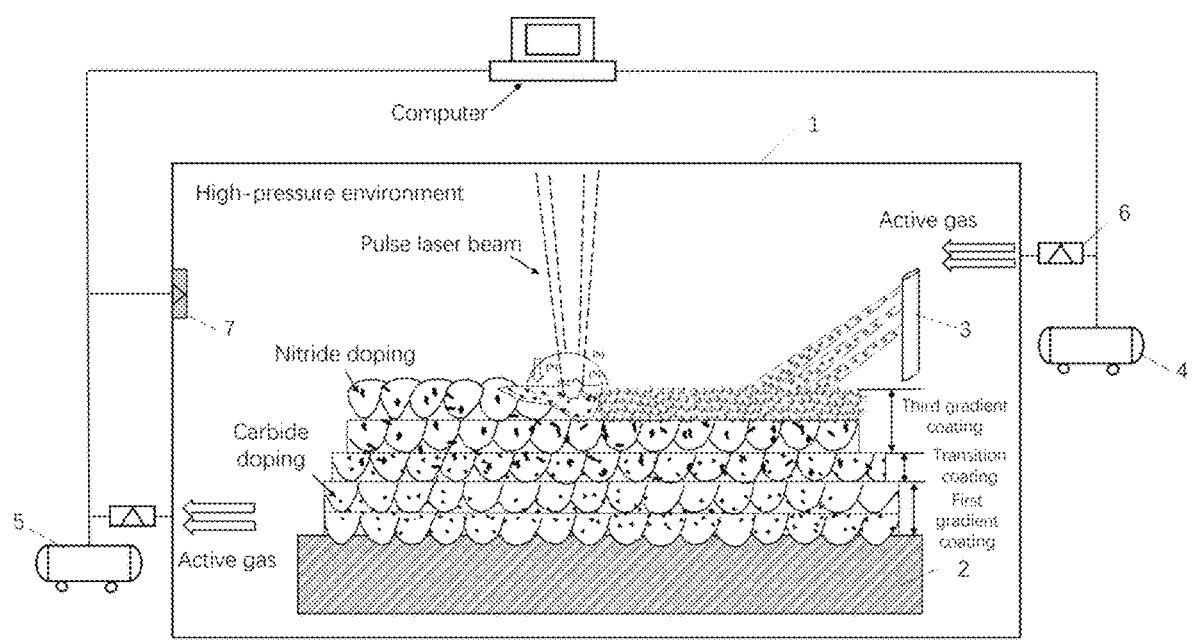
FIG. 1 is a schematic diagram of a high-pressure and multi-atmosphere assisted SLM gradient material preparation method according to the present disclosure.

As shown in FIG. 1, the present disclosure provides a high-pressure and multi-atmosphere assisted SLM gradient material preparation method, including the following steps:

before SLM formation, impurity powder in a working box is removed, and rough grinding is performed on the surface of a substrate 2 to improve the bonding strength between an aluminum-lithium alloy coating and the substrate 2; after being treated with absolute ethyl alcohol, the surface of the substrate 2 is ultrasonically cleaned and dried;

argon is injected into the working box 1 for a period of time, and then a first gas mixture is continuously injected into the working box 1, wherein the first gas mixture is a gas mixture of argon and a $CO_2$ gas, and the volume ratio of the $CO_2$ gas is 10%-20%; the flow rate of all active gases in the SLM process is monitored by a gas flow meter 6 at a vent of the working box and maintained at 20 L/min-50 L/min; a high-pressure environment in the working box 1 is maintained by means of a boost pump 4, and a pressure gauge 7 is arranged in the working box 1 to monitor the pressure in the working box 1 and maintain the pressure in the working box 1 within 3.5-5.0 MPa;

a layer of loose aluminum-lithium alloy powder with a thickness of 40-50 μm and a diameter of 20-63 μm is laid on the substrate by means of a porous duster; the aluminum-lithium alloy powder laid on the surface of the substrate 2 is irradiated according to appropriate pulse laser parameters and process path to form a micro-melt pool, and molten materials in the micro-melt pool react with the carbon-containing active gas to form a carbide-doped first gradient aluminum-lithium alloy coating; in addition, under the action of a high pressure, the grain structure of the coating is remarkably refined, such that the hardness and toughness of the first gradient aluminum-lithium alloy coating are synergistically improved; laying and irradiation of the aluminum-lithium alloy powder are repeated until the thickness of the first gradient aluminum-lithium alloy coating reaches 0.8-1.0 mm;

after the first gradient aluminum-lithium alloy coating is prepared, argon is injected into the working box 1 to completely discharge the first gas mixture out of the working box 1; then, a second gas mixture is continuously injected into the airtight working box 1, wherein the second gas mixture is a gas mixture of an Ar gas and a $CO_2+N_2$ active gas, the volume ratio of a $CO_2$ gas in the second gas mixture is 10%-20%, and the volume ratio of a $N_2$ gas in the second gas mixture is 20%-30%; a high-pressure environment in the working box 1 is maintained by means of the boost pump 4, and the pressure in the working box 1 is monitored and maintained within 2.0-2.5 MPa by means of the pressure gauge 7 arranged in the working box 1; under the condition where the pulse laser parameters and the process path remain unchanged, aluminum-lithium alloy powder laid on the surface of the first gradient aluminum-lithium alloy coating is irradiated with laser to form a micro-melt pool, and molten materials in the micro-melt pool react with the carbon and nitrogen-containing active gas to form a carbide and nitride-doped second gradient aluminum-lithium alloy coating, wherein the second gradient aluminum-lithium alloy coating is a transition coating; powder laying and irradiation are repeated until the thickness of the transition coating reaches 0.6-0.8 mm;

after the second gradient aluminum-lithium alloy coating is prepared, argon is injected into the working box 1 to completely discharge the second gas mixture out of the working box 1; then, a third gas mixture is continuously injected into the airtight working box 1 to maintain a high-pressure environment in the working box 1, wherein the third gas mixture is a gas mixture of an Ar gas and a $N_2$ active gas, wherein the volume ratio of the $N_2$ active gas is 20%-30%; the high-temperature environment in the working box 1 is maintained by means of the boost pump 4, and the pressure in the working box 1 is monitored and maintained within 1.0-1.5 MPa by means of the pressure gauge 7 arranged in the working box 1; under the condition where the pulse laser parameters and the process path remain unchanged, aluminum-lithium alloy powder laid on the surface of the second gradient aluminum-lithium alloy coating is irradiated with laser to form a micro-melt pool, and molten materials in the micro-melt pool react with the nitrogen-containing gas to form a nitride-doped third gradient aluminum-lithium alloy coating; powder laying and irradiation are repeated until the thickness of the third gradient aluminum-lithium alloy coating reaches 0.8-1 mm.

According to the high-pressure and multi-atmosphere assisted SLM gradient material preparation method provided by the present disclosure, the carbon-containing active gas and the nitrogen-containing active gas are continuously injected into the working box 1, and a gradient high-pressure environment in the working box 1 is maintained; pulse laser is used as an irradiation heat source to perform SLM formation on aluminum-lithium alloy powder, molten materials in the melt pool react with the carbon-containing active gas and the nitrogen-containing active gas in the forming process to complete doping of different strengthening phases, and under the action of different pressures, the microstructure of the gradient coatings changes transitionally, such that a prepared aluminum-lithium alloy gradient material is hard outside and tough inside. The carbon-containing active gas is used for atmospheric doping in the SLM process of the first gradient aluminum-lithium alloy coating; under the action of laser irradiation, active carbon atoms are dissociated, and plasma is formed above the melt pool; under the action of a high pressure and swelling shock waves of the plasma, the carbon atoms are stirred and blended with molten materials in the melt, such that the content of carbon on a surface layer of aluminum-lithium alloy is greatly increased, thus improving the abrasion resistance and mechanical stability of the first gradient aluminum-lithium alloy coating. The nitrogen-containing active gas is used for atmospheric doping in the preparation process of the third gradient aluminum-lithium alloy coating, active nitrogen atoms separated out under the action of laser infiltrate into the high-temperature melt pool by means of a gas-liquid interface, migrate in the melt pool and finally are dissolved to realize doping of high-hardness nitrogen particles in the coating, and compared with the first gradient coating only doped with carbides, the surface hardness and abrasion resistance of the third gradient aluminum-lithium alloy coating are further improved. The carbon and nitrogen-containing active gas is injected into the working box to prepare the second gradient aluminum-lithium alloy coating, and under the action of laser irradiation, carbon atoms and nitrogen atoms are dissociated from the active gas at the same time; the active atoms react with molten materials in the high-temperature melt pool to realize synchronous doping of carbides and nitrides, such that a gradient, continuous and transitional change of the mechanical property of the aluminum-lithium alloy gradient material is facilitated, and the interlayer bonding force of the gradient material is effectively improved. Uniform and loose aluminum-lithium alloy powder is laid by means of the porous duster, part of the active gases infiltrates into the loose powder layer, and under the action of laser irradiation, active atoms are directly dissociated from the active gases and melted in the high-temperature melt pool, such that the content of carbon and nitrogen in the melt pool are increased, and the mechanical property of the aluminum-lithium alloy material is further improved. By performing SLM formation in a high-pressure environment, the nucleation rate in the melt pool is increased, such that the grain structure of the aluminum-lithium alloy coatings is further refined; the high pressure-assisted process increases the concentration of carbon atoms and nitrogen atoms absorbed by molten metal in the melt pool and promotes the in-situ synthesis doping of carbides and nitrides in the aluminum-lithium alloy gradient material, thus improving the forming quality of the prepared material and further improving the hardness and mechanical property of the gradient material. With the further assistance of a gradient high pressure in SLM formation, the size of gains in the material increases gradually with the decrease in the pressure of the working environment, such that the first gradient coating has the minimum grain size and shows the maximum toughness; in conjunction with the transition layer and the third gradient aluminum-lithium alloy coating that are doped with high-hardness nitride particles, the gradient high pressure-assisted process makes the prepared SLM gradient material hard outside and tough inside. Pulse laser is used for SLM formation, the stirring effect in the melt pool is enhanced to make the element distribution more uniform and effectively increase the cooling rate of the melt pool, such that heat accumulation of the material is reduced, thus effectively reducing residual stress of the prepared material.

To better clarify the purposes, technical solutions and advantages of the present disclosure, with 2195 aerospace aluminum-lithium alloy as an object of study, the present disclosure is described in detail in conjunction with specific embodiments.

Embodiment 1

In Embodiment 1, the high-pressure and multi-atmosphere assisted SLM gradient material preparation method includes the following steps:

S01: before SLM formation, impurity powder in a working box 1 was removed, and a 2195 aluminum-lithium alloy substrate 2 was ground with abrasive paper with a grit size of 800# and 1000# to improve the bonding strength of a formed aluminum-lithium alloy coating and the substrate 2; after being treated with absolute ethyl alcohol, the surface of the substrate 2 was ultrasonically cleaned and dried;

S02: argon was injected into the working box 1 for 15 min, and then an Ar+10% $CO_2$ active gas was injected into the working box 1;

S03: the flow rate of the active gas was monitored by means of a gas flow meter 6 at a vent of the working box 1, and the flow rate of all active gases was maintained at 50 L/min in the SLM process;

S04: a high-pressure environment in the working box was maintained by means of a boost pump 4, and a pressure gauge 7 was arranged in the working box 1 to monitor the pressure in the working box 1 and maintain the pressure in the working box 1 at 3.5 MPa in the SLM process;

S05: a layer of loose aluminum-lithium alloy powder with a thickness of 50 μm and a diameter of 50 μm was laid on the substrate 2 by means of a porous duster 3;

S06: an IPG-YLS-5000 fiber laser was used and switched from a light-exiting mode to a pulse mode, wherein specific machining parameters of the laser were as follows: the wavelength was 1075 nm, the pulse energy was 20 J, the pulse period was 80 ms, the pulse duration was 40 ms, the duty cycle was 50%, and the spot diameter was 50 μm; specific process parameters in the SLM forming process were as follows: the laser power was 90 W, the scan speed was 100 mm/s, the scan interval was 220 μm, and a scan path in the forming process was determined by an interlayer orthogonal strategy; laying of the aluminum-lithium alloy powder was repeated until the thickness of a first gradient aluminum-lithium alloy coating reached 0.8 mm;

S07: after the first gradient aluminum-lithium alloy coating was prepared, argon was injected into the working box for 15 min to completely discharge a first gas mixture out of the working box, then Ar+10% $CO_2$+ 20% $N_2$ was injected into the working box, and a 2.0 MPa high-pressure environment in the working box was maintained by means of the pressure gauge 7;

S08: under the condition where the pulse laser parameters and the process path remained unchanged, powder laying was repeated until the thickness of a second gradient aluminum-lithium alloy coating (transition coating) was 0.6 mm;

S09: argon was injected into the working box 1 for 15 min to completely discharge a second mixture gas out of the working box 1, then Ar+20% $N_2$ was injected into the working box 1, and a 1.0 MPa high-pressure environment in the working box 1 was maintained by means of the pressure gauge 7; and S10: under the same process condition, powder was laid and molten multiple time until the thickness of a third gradient aluminum-lithium alloy coating was 0.8 mm; according to the machining parameters, SLM was performed in the working box with a gradient high pressure and multiple active atmospheres to prepare an aluminum-lithium alloy gradient material with a defect-free matrix and good abrasion resistance.

Figure 2:
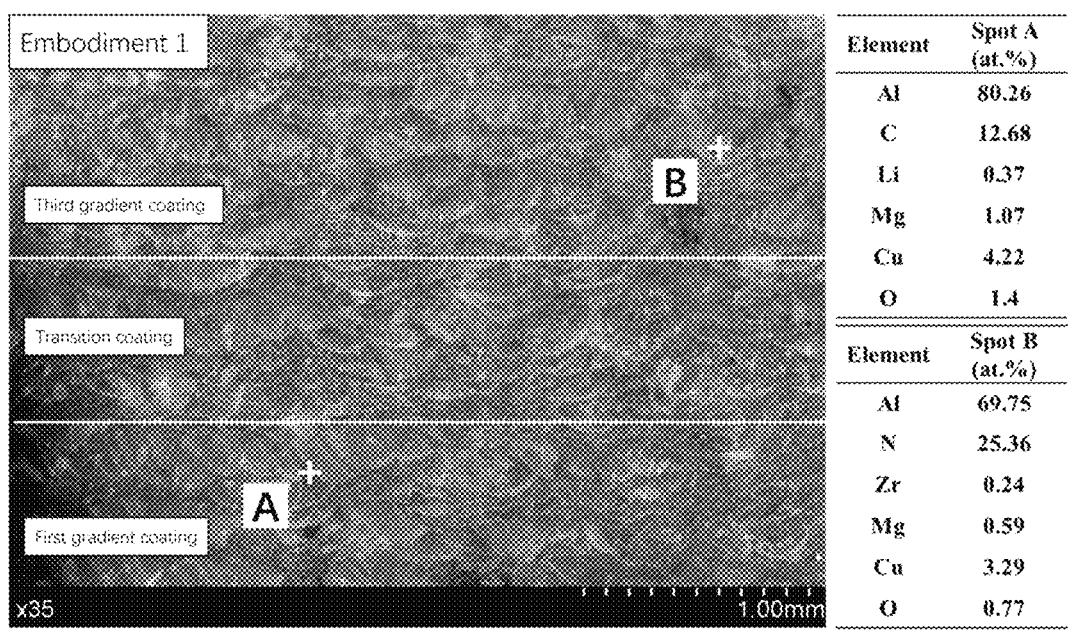
FIG. 2 is a picture of the cross-sectional morphology, carbon content and nitrogen content of a gradient material prepared in Embodiment 1 of the present disclosure.
Figure 3:
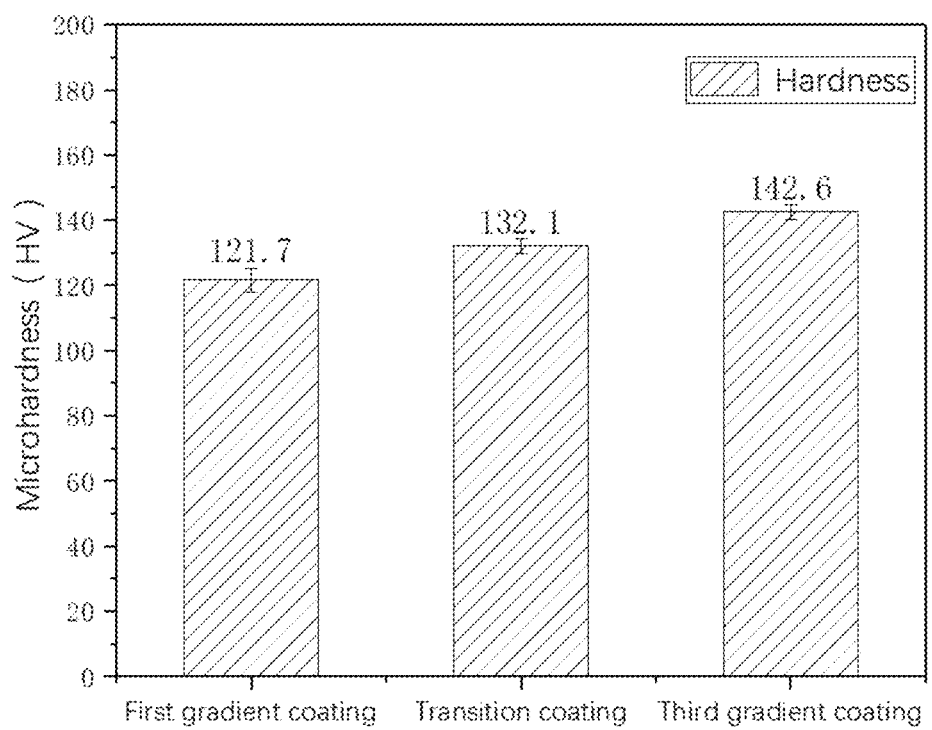
FIG. 3 illustrates the cross-sectional mean microhardness of each gradient coating of a sample prepared in Embodiment 1 of the present disclosure.
Figure 4:
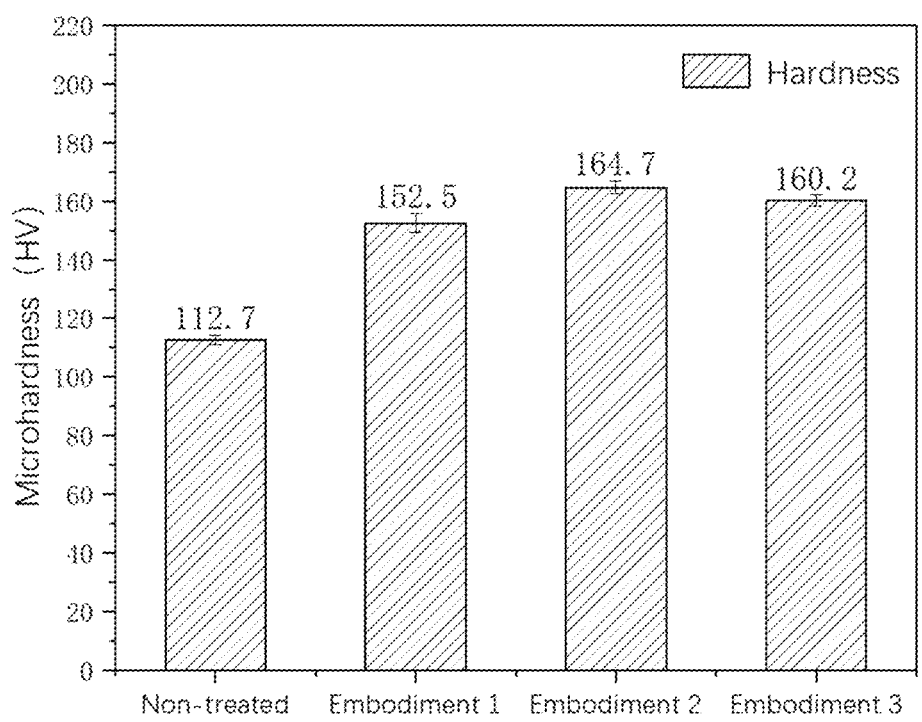
FIG. 4 is a comparison chart of the surface microhardness of gradient materials prepared in embodiments of the present disclosure.

As shown in FIG. 2 which illustrates the cross-sectional morphology of the aluminum-lithium alloy gradient material prepared in Embodiment 1, compared with a traditional sample formed by SLM, the microstructure of the gradient material prepared in Embodiment 1 is refined gradually form outside to inside, the first gradient coating prepared in the maximum pressure environment has the finest grain structure and the maximum toughness, and EDS spot scan results of points A and B indicate that hard-phase particles in the gradient material are doped with 12.68 at. % of C and 25.36 at. % of N, proving that the carbide doping and nitride doping of the SLM material are realized by means of the carbon-containing active gas and the nitrogen-containing active gas. As shown in FIG. 3 which illustrates the cross-sectional mean microhardness of each gradient coating of the sample prepared in Embodiment 1, the microhardness decreases gradually from the first gradient coating to the third gradient coating, and in conjunction with the gradual decrease in toughness from inside to outside of the gradient material, the SLM aluminum-lithium alloy gradient material prepared in Embodiment 1 is hard outside and tough inside. In addition, as shown in FIG. 4, under the synergistic effect of the high pressure and in-situ synthesis of active gases, the content of carbon and nitrogen in the aluminum-lithium alloy gradient material is increased, the surface hardness of the material is greatly improved, and the microhardness reaches 152.5 HV Compared with the mean microhardness 112.7 HV of traditional SLM surfaces, the microhardness of the material is increased by 35.5%, which is of great significance for reducing costs and effectively improving the abrasion resistance of the SLM aluminum-lithium alloy material.

Embodiment 2

On the basis of Embodiment 1, in Embodiment 2, the active gas used in the preparation process of the first gradient aluminum-lithium alloy coating was Ar+15% $CO_2$, and the pressure was maintained at 5.0 MPa; the active gas used for preparing the transition coating was Ar+15% $CO_2$+25% $N_2$, and the pressure was maintained at 2.5 MPa; the active gas used in the preparation process of the third gradient aluminum-lithium alloy coating was Ar+25% $N_2$, and the pressure was maintained at 1.5 MPa; the flow rate of all the active gases was 35 L/min.

Compared with the material prepared in Embodiment 1, the overall microstructure of a gradient material obtained in Embodiment 2 is finer, and the content of hard-phase particles C and the content of hard-phase particles N are respectively increased to 16.92 at. % and 28.2 at. %. In Embodiment 2, a higher pressure environment, a lower gas flow rate and a higher proportion of $CO_2$ and $N_2$-doped active gas were used to assist SLM formation of a sample, the reaction efficiency of molten materials and the active gases is improved, the size and doping content of carbides and nitrides in the material are increased, and the strengthening effect on the aluminum-lithium alloy material is effectively improved. As shown in FIG. 4, the surface microhardness of the aluminum-lithium alloy material prepared in this embodiment is 164.7 HV; compared with the mean microhardness 112.7 HV of the surface of a traditional sample prepared by SLM, the microhardness of the sample in this embodiment is increased by 46.1%; compared with the mean microhardness 152.5 HV of the surface of the sample treated in Embodiment 1, the microhardness of the sample in this embodiment is increased by 8%. By properly increasing the pressure, decreasing the flow rate of active gases and increasing the proportion of $CO_2$ and $N_2$ in the gases, the stirring reaction between the molten materials in the melt pool and the dissociated active atoms will be more sufficient, such that the surface hardness and mechanical stability of the aluminum-lithium alloy material are further improved.

Embodiment 3

On the basis of Embodiment 1, in Embodiment 3, the active gas used in the preparation process of the first gradient aluminum-lithium alloy coating was Ar+20% $CO_2$, the pressure was maintained at 5.0 MPa, and the thickness of the prepared first gradient aluminum-lithium alloy coating was 1.0 mm; the active gas used for preparing the transition coating was Ar+20% $CO_2$+30% $N_2$, the pressure was maintained at 2.5 MPa, and the thickness of the transition coating was 0.8 mm; the active gas used in the preparation process of the third gradient aluminum-lithium alloy coating was Ar+30% $N_2$, the pressure was maintained at 1.5 MPa, and the thickness of the finally prepared third gradient aluminum-lithium alloy coating was 1.0 mm; the flow rate of all the active gases was 20 L/min; the laser power was set to 1000 W.

Because the laser power and the thickness of each gradient coating are increased, a sample treated in Embodiment 3 was doped with more carbide and nitride particles with a larger size, the C content of the carbide particles is 17.18 at. %, and the N content of the nitride particles was 29.7 at. %. Under the effect of heat accumulated in the material, the microstructure of the sample prepared in Embodiment 3 is not obviously refined even if the pressure is increased, as compared with the sample prepared in Embodiment 1. The surface microhardness of the aluminum-lithium alloy material prepared in this embodiment is 160.2 HV; compared with the mean microhardness 112.7 HV of a traditional SLM surface, the microhardness of the material in this embodiment is improved by 42.100, indicating that the material prepared in Embodiment 3 also has good abrasion resistance and mechanical stability.

TABLE 1

Characterization results of samples prepared by different treatment processes in the present disclosure

| | | Characterization results | | |
|---|---|---|---|---|
| Treatment methods | | Doping content of carbon particles/at. % | Doping content of nitrogen particles/at. % | Mean microhardness/ HV |
| Traditional SLM sample (Ar protection, one atmospheric pressure) | | 0.15 | — | 112.7 |
| High-pressure and multi-atmosphere assisted SLM gradient material | Embodiment 1 | 12.68 | 25.36 | 152.5 |
| | Embodiment 2 | 16.92 | 28.2 | 164.7 |
| | Embodiment 3 | 17.18 | 29.7 | 160.2 |

An aluminum-lithium alloy coating is formed on the surface of a base material 2 by means of the high-pressure and multi-atmosphere assisted SLM gradient material preparation method. Here, the base material 2 may be skin of an aircraft.

It should be understood that although the present disclosure is described with reference to embodiments, each embodiment does not include only one independent technical solution, and the way of narration here is merely for the purpose of a clear description. Those skilled in the art should regard the description as a whole, and the technical solutions in the embodiments may be appropriately combined to obtain other embodiments that can be understood by those skilled in the art.

A series of detailed description above are merely used to specifically explain feasible embodiments of the present disclosure and are not intended to limit the protection scope of the present disclosure. All equivalent embodiments or transformations made without departing from the spirit of the present disclosure should also fall within the protection scope of the present disclosure.

The invention claimed is:

1. A high-pressure and multi-atmosphere assisted selective laser melting (SLM) gradient material preparation method, comprising the following steps:

continuously injecting a first gas mixture into an airtight working box to maintain a high-pressure environment in the airtight working box, wherein the first gas mixture is a gas mixture of an inert gas and a carbon-containing active gas; and irradiating aluminum-lithium alloy powder laid on a surface of a substrate with a laser to form a micro-melt pool, and enabling molten materials in the micro-melt pool to react with the carbon-containing active gas to form a carbide-doped first gradient aluminum-lithium alloy coating;

discharging the first gas mixture out of the airtight working box; continuously injecting a second gas mixture into the airtight working box to maintain a high-pressure environment in the airtight working box, wherein the second gas mixture is a gas mixture of an inert gas and a carbon and nitrogen-containing active gas; irradiating aluminum-lithium alloy powder laid on a surface of the carbide-doped first gradient aluminum-lithium alloy coating with the laser to form a micro-melt pool, and enabling molten materials in the micro-melt pool to react with the carbon and nitrogen-containing active gas to form a carbide and nitride-doped second gradient aluminum-lithium alloy coating; and discharging the second gas mixture out of the airtight working box; continuously injecting a third gas mixture into the airtight working box to maintain a high-pressure environment in the airtight working box, wherein the third gas mixture is a gas mixture of an inert gas and a nitrogen-containing active gas; irradiating aluminum-lithium alloy powder laid on a surface of the carbide and nitride-doped second gradient aluminum-lithium alloy coating with the laser to form a micro-melt pool, and enabling molten materials in the micro-melt pool to react with the nitrogen-containing active gas to form a nitride-doped third gradient aluminum-lithium alloy coating, wherein, a pressure of the high-pressure environment created by the first gas mixture is $P_1$, a pressure of the high-pressure environment created by the second gas mixture is $P_2$, a pressure of the high-pressure environment created by the third gas mixture is $P_3$, and $P_1 > P_2 > P_3$; the pressure $P_1$ of the high-pressure environment created by the first gas mixture is 3.5-5.0 MPa, the pressure $P_2$ of the high-pressure environment created by the second gas mixture is 2.0-2.5 MPa, and the pressure $P_3$ of the high-pressure environment created by the third gas mixture is 1.0-1.5 MPa.

2. The high-pressure and multi-atmosphere assisted SLM gradient material preparation method according to claim 1, wherein the carbon-containing active gas in the first gas mixture is a $CO_2$ gas, and a volume ratio of the $CO_2$ gas in the first gas mixture is 10%-20%; the carbon and nitrogen-containing active gas in the second gas mixture comprises a $CO_2$ gas and a $N_2$ gas, a volume ratio of the $CO_2$ gas in the second gas mixture is 10%-20%, and a volume ratio of the $N_2$ gas in the second gas mixture is 20%-30%; the nitrogen-containing active gas in the third gas mixture is a $N_2$ gas, and a volume ratio of the $N_2$ gas in the third gas mixture is 20%-30%.

3. The high-pressure and multi-atmosphere assisted SLM gradient material preparation method according to claim 1, wherein in an SLM formation process, a flow rate of the active gases is maintained at 20 L/min-50 L/min to ensure that a concentration of the active gases in a reaction process of the molten materials is within a set range.

4. The high-pressure and multi-atmosphere assisted SLM gradient material preparation method according to claim 3, wherein the carbide-doped first gradient aluminum-lithium alloy coating and the nitride-doped third gradient aluminum-lithium alloy coating have a thickness of 0.8-1.0 mm, and the carbide and nitride-doped second gradient aluminum-lithium alloy coating has a thickness of 0.6-0.8 mm.

5. The high-pressure and multi-atmosphere assisted SLM gradient material preparation method according to claim 1, wherein uniform and loose aluminum-lithium alloy powder is laid by means of a porous duster to ensure that part of the active gases is stored in the powder.

6. The high-pressure and multi-atmosphere assisted SLM gradient material preparation method according to claim 1, wherein surface roughness of the surface of the substrate is increased to improve bonding strength of the formed aluminum-lithium alloy coatings and the substrate; and after being treated with absolute ethyl alcohol, the surface of the substrate is ultrasonically cleaned and dried.

7. The high-pressure and multi-atmosphere assisted SLM gradient material preparation method according to claim 1, wherein the laser is a pulse laser, and parameters of a pulse laser beam of the pulse laser are as follows: a wavelength is 1075 nm, pulse energy is 1 J-30 J, a pulse period is 80 ms, a pulse duration is 20-60 ms, a duty cycle is 50%, a spot diameter is less than or equal to 50 μm, a laser power is 80-100 W, a scan speed of the pulse laser beam is 100 mm/s, and a scan interval is 100-120 μm.

* * * * *